US009836928B2

(12) United States Patent
Caravello

(10) Patent No.: US 9,836,928 B2
(45) Date of Patent: Dec. 5, 2017

(54) SYSTEM AND METHOD OF IDENTIFYING A SPECIFIC KEY AMONGST A BUNDLE OF KEYS

(71) Applicant: Jennifer Caravello, Carol Stream, IL (US)

(72) Inventor: Jennifer Caravello, Carol Stream, IL (US)

( * ) Notice: Subject to any disclaimer, the term of this patent is extended or adjusted under 35 U.S.C. 154(b) by 0 days.

(21) Appl. No.: 15/431,593

(22) Filed: Feb. 13, 2017

(65) Prior Publication Data

US 2017/0236386 A1 Aug. 17, 2017

Related U.S. Application Data

(60) Provisional application No. 62/294,439, filed on Feb. 12, 2016.

(51) Int. Cl.
*G08B 5/22* (2006.01)
*H04Q 1/30* (2006.01)
*G08B 5/36* (2006.01)

(52) U.S. Cl.
CPC .................................... *G08B 5/36* (2013.01)

(58) Field of Classification Search
CPC ....................................................... G08B 5/36
USPC ........................................................ 340/7.61
See application file for complete search history.

(56) References Cited

U.S. PATENT DOCUMENTS

2010/0060452 A1* 3/2010 Schuster ............ G08B 13/2402 340/572.1
2012/0144197 A1* 6/2012 Chung .................. H04L 9/3273 713/169

* cited by examiner

*Primary Examiner* — Nader Bolourchi

(57) ABSTRACT

A method of identifying a specific key amongst a bundle of keys requires a plurality of keyhole tags and a plurality of key sleeves. Each of the keyhole tags includes a wireless transmitter. Each of the key sleeves includes a wireless receiver and at least one notification device that is associated to a corresponding tag. The method begins by broadcasting an identification signal with the wireless transmitter for each of the plurality of keyhole tags. The method then positions the plurality of key sleeves adjacent to a desired tag from the plurality of keyhole tags. The method then receives the identification signal for the desired tag with the wireless receiver for each of the plurality of key sleeves. Finally, the method actuates the notification device of a specific sleeve from the plurality of key sleeves, if the corresponding tag for the specific sleeve is the desired tag.

10 Claims, 10 Drawing Sheets

SYSTEM AND METHOD OF IDENTIFYING A SPECIFIC KEY AMONGST A BUNDLE OF KEYS

The current application claims priority to U.S. provisional application Ser. No. 62/294,439 filed on Feb. 12, 2017. The current application is filed on Feb. 13, 2017 while Feb. 12, 2017 was on a weekend.

FIELD OF THE INVENTION

The present invention generally relates to identifying a specific key amongst a bundle of keys. More specifically, the present invention allows a user to identify a specific key through physical and visual alerts.

BACKGROUND OF THE INVENTION

Fumbling over keys on a regular basis is not only tedious and frustrating but may put individuals in a dangerous position. Typically, a bundle of keys holds a key for a car, a household door, a garage door, an office door, a lock, and so on. If an individual is trying to access any of these items and while in the dark, the inability to quickly differentiate between the keys increases the amount of time sorting through each of the keys and puts an individual in a vulnerable position. Not being able to quickly enter or retrieve an item at night allows others to easily approach the individual. An individual may be forced to be exposed to unpleasant weather conditions if he or she cannot enter a doorway quickly.

The present invention facilitates the differentiation between each of the keys in a user's bundle of keys so that the user does not waste time fumbling through their keys. The present invention is configured onto a plurality of keyholes and a plurality of keys.

The present invention is used to illuminate and vibrate a specific key, if the specific key is positioned proximal to its corresponding keyhole. This prevents the user from having to insert each key from their bundle of keys into the keyhole. The present invention allows a user to immediately recognize which key belongs to which keyhole.

DETAIL DESCRIPTIONS OF THE INVENTION

All illustrations of the drawings are for the purpose of describing selected versions of the present invention and are not intended to limit the scope of the present invention.

Figure 1A:
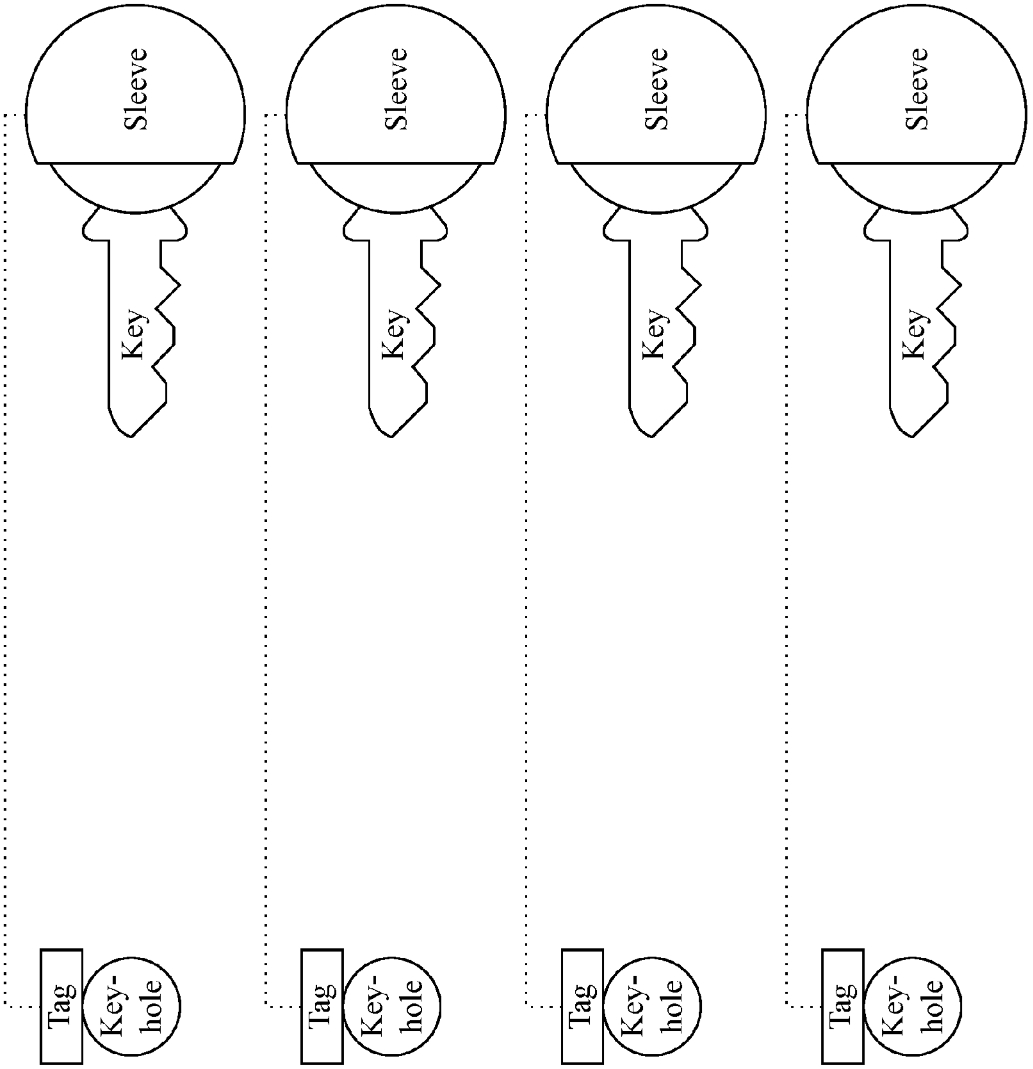
FIG. 1A is a schematic view of the electric connection between each of the keyhole tags and a corresponding key sleeve of the present invention.
Figure 1B:
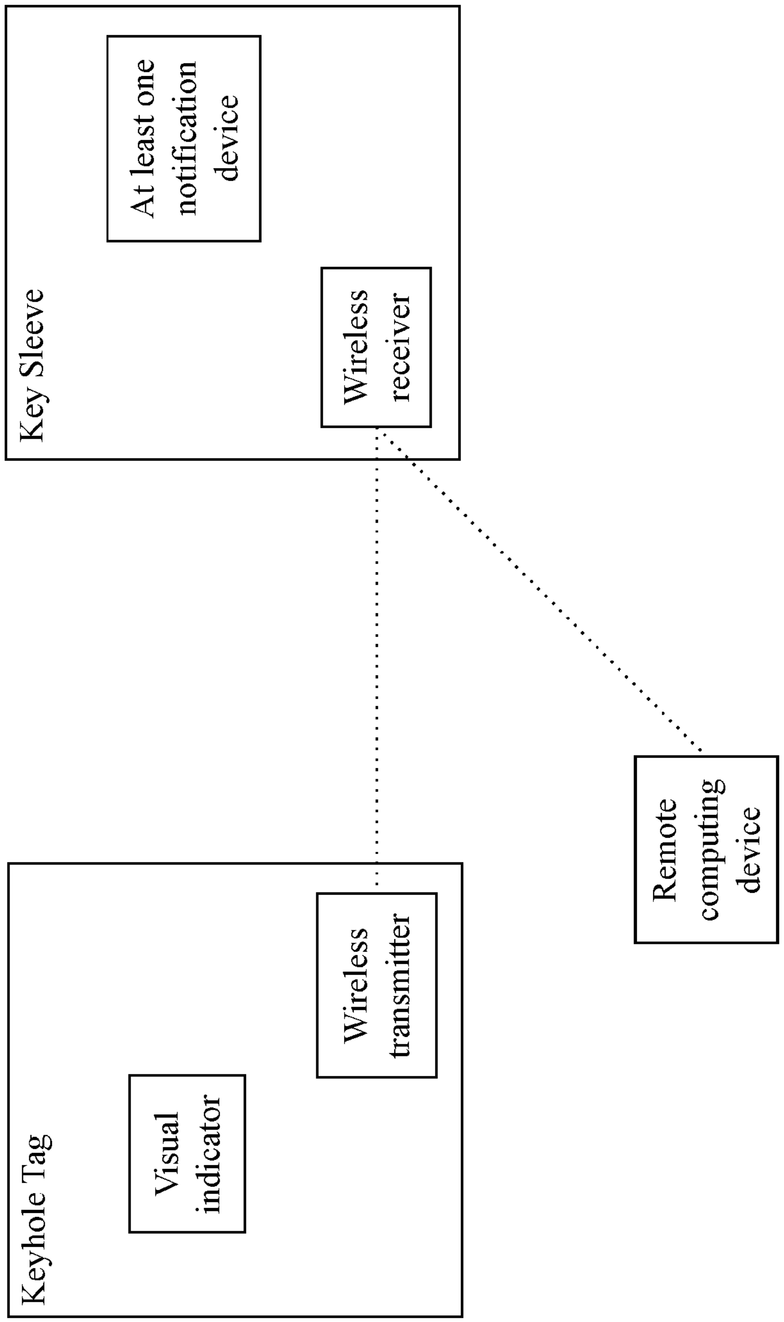
FIG. 1B is a schematic view of the wireless communication between the wireless transmitter, the wireless receiver, and the remote computing device for the present invention.

The present invention is a method of identifying a specific key amongst a bundle of keys. The present invention is used to facilitate the identification of a specific key without having to insert even one or more keys into the corresponding keyhole. Thus, the physical system used to implement the method of the present invention includes a plurality of keyhole tags, wherein each of the plurality of keyhole tags comprises a wireless transmitter (Step A), as shown in FIG. 1B. The plurality of keyhole tags allows the present invention to identify different keyholes from each other. The present invention also utilizes a plurality of key sleeves, wherein each of the plurality of key sleeves comprises a wireless receiver and at least one notification device, as shown in FIG. 1B, and is associated to the corresponding tag from the plurality of keyhole tags (Step B). Similarly, the plurality of key sleeves allows the present invention to identify different keys from each other. The wireless transmitter allows each keyhole tag to communicate with the wireless receiver of each key sleeve. The wireless transmitter is preferably a near field communication device or a Bluetooth device. The at least one notification device alerts the user of the corresponding key sleeve to that of a keyhole. Each of the keyhole tags is unique to a keyhole, and each of the key sleeves is unique to a key. The user is physically and visually notified between the communication between the wireless transmitter and the corresponding wireless receiver.

Figure 2:
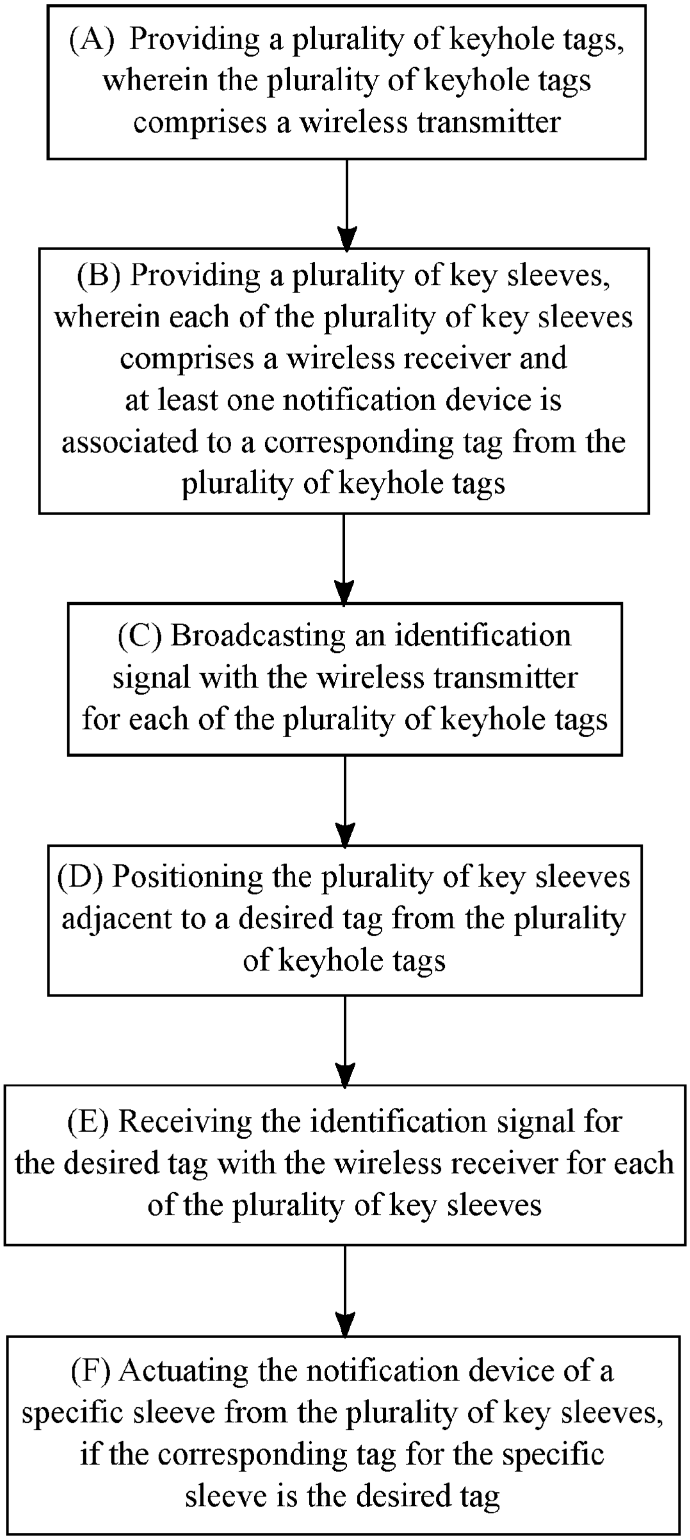
FIG. 2 is a flowchart illustrating the overall process for the present invention.

The overall process for the present invention includes the following steps that are implemented with the plurality of keyhole tags and the plurality of key sleeves, as illustrated in FIG. 2. The overall process begins with the broadcasting of an identification signal with the wireless transmitter for each of the plurality of keyhole tags (Step C) so that any of the plurality keyhole tags is able to readily communicate with each of the plurality of key sleeves, as shown in FIG. 1A. The identification signal carries identification information that can be used to uniquely identify each keyhole tag. The plurality of key sleeves is positioned adjacent to a desired tag from the plurality of keyhole tags (Step D), allowing the plurality of key sleeves to receive the identification signal. For example, a bundle of keys is positioned near a door lock with the desired tag so that the desired tag may communicate with the corresponding key sleeve. The identification signal extends a limited distance so that the corresponding key sleeve does not notify the user unless the user is near the keyhole. Once the identification signal of the desired tag is received by the wireless receiver of each of the plurality of key sleeves each of the plurality of key sleeves effectively communicates with a keyhole tag (Step E).

The notification device of a specific sleeve from the plurality of key sleeves is actuated if the corresponding tag for the specific sleeve is the desired tag (Step F). This allows a user to be made aware of the specific key sleeve that corresponds to the keyhole.

Figure 3:
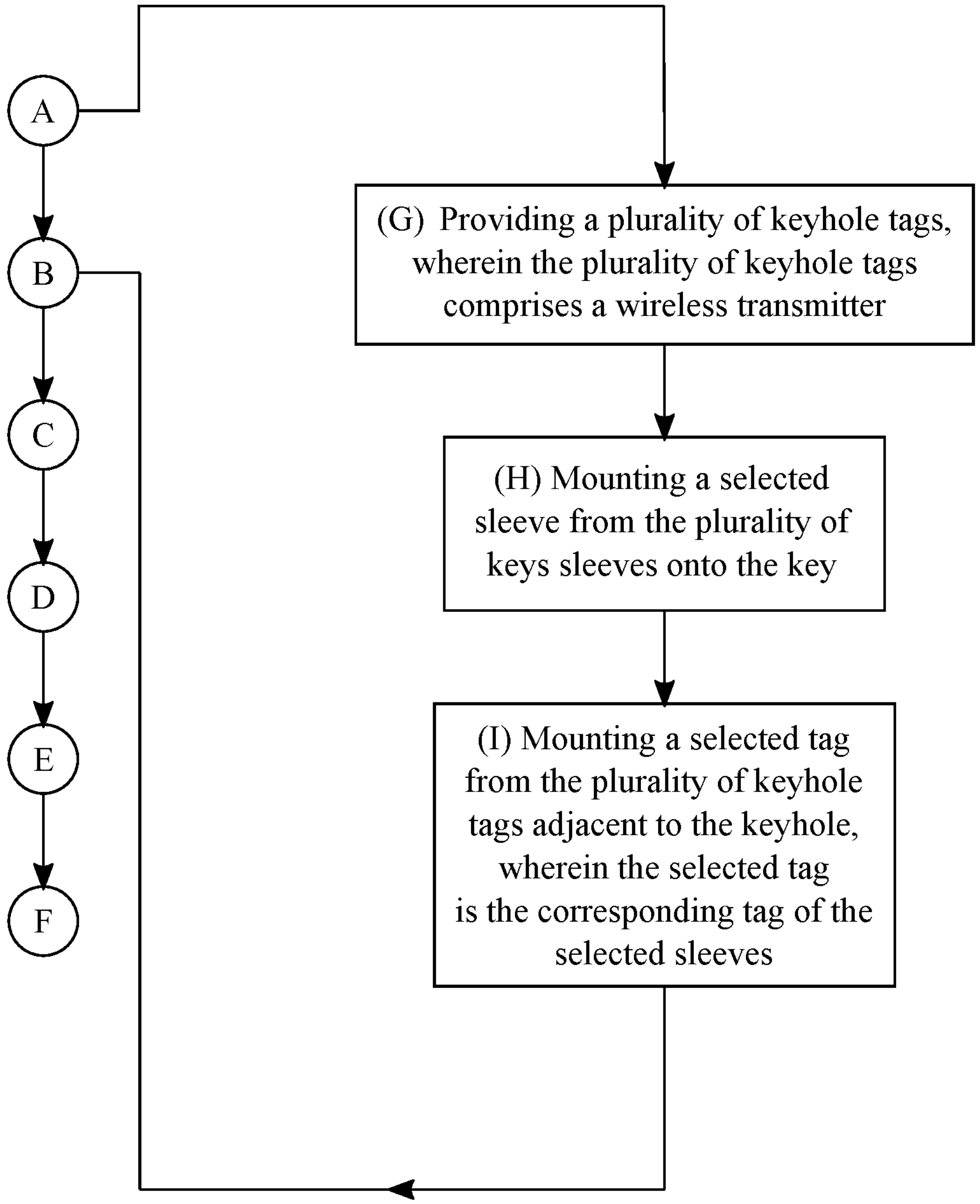
FIG. 3 is a flowchart illustrating the overall process for mounting a selected sleeve and a selected tag.

The present invention accommodates a variety of keyholes and a variety of keys, wherein a specific key is used to unlock a specific keyhole. In order to coordinate between the variety of keyholes and the variety of keys, the user mounts a selected sleeve from the plurality of key sleeves onto the key, as shown in FIG. 3. The user also mounts a selected tag from the plurality of keyhole tags adjacent to the keyhole, wherein the selected tag is the corresponding tag of the selected sleeve. In the preferred embodiment of the present invention, the selected sleeve is with a hinged case and an on/off button.

Figure 4:
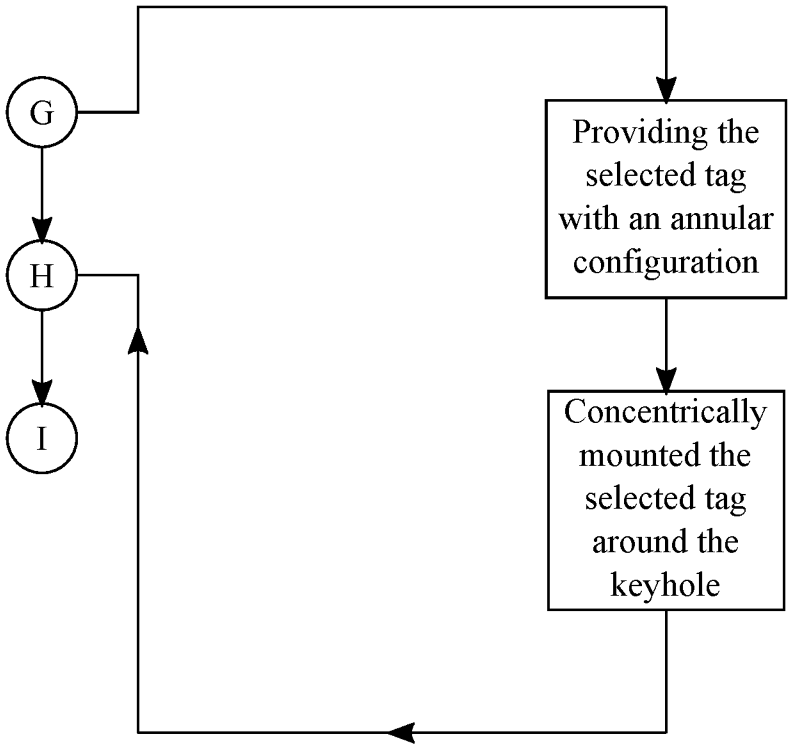
FIG. 4 is a flowchart illustrating the process of concentrically mounting the selected tag around the keyhole.
Figure 5:
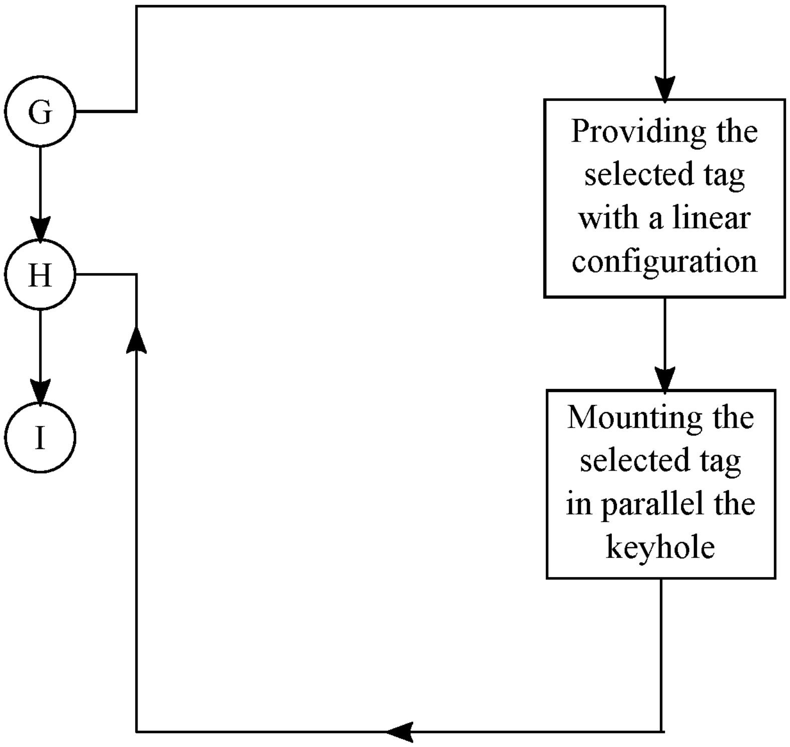
FIG. 5 is a flowchart illustrating the process of mounting the selected tag in parallel the keyhole.
Figure 6:
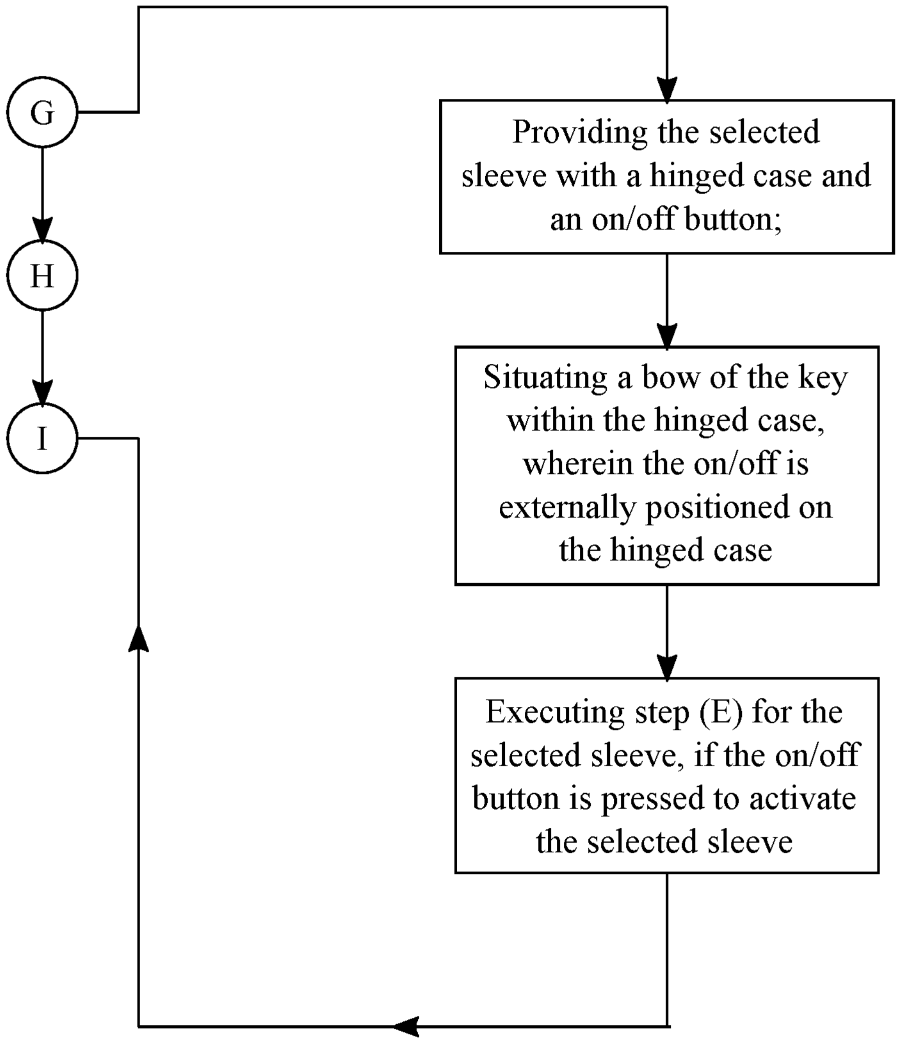
FIG. 6 is a flowchart illustrating the process of situating a bow of the key within a hinged case.

The hinged case allows for the interchangeability and replacement of sleeves amongst a bundle of keys. The on/off button allows the user to activate or to deactivate the wireless receiver. In order to attach the key to the selected sleeve, the user situates a bow of the key within the hinged case, wherein the on/off button is externally positioned on the hinged case, as shown in FIG. 6. Step (E) is executed for the selected sleeve, if the on/off button is pressed to activate the selected sleeve. The corresponding tag of the selected sleeve is mounted adjacent to the keyhole. Provided the selected tag is of an annular configuration, the user concentrically mounts the selected tag around the keyhole, as shown in FIG. 4. Provided the selected tag is of a linear configuration, the user mounts the selected tag in parallel to the keyhole, as shown in FIG. 5. The annular configuration may better accommodate a keyhole plate with a circular frame, and the linear configuration may better accommodate a keyhole plate with a square or rectangular frame.

Figure 7:
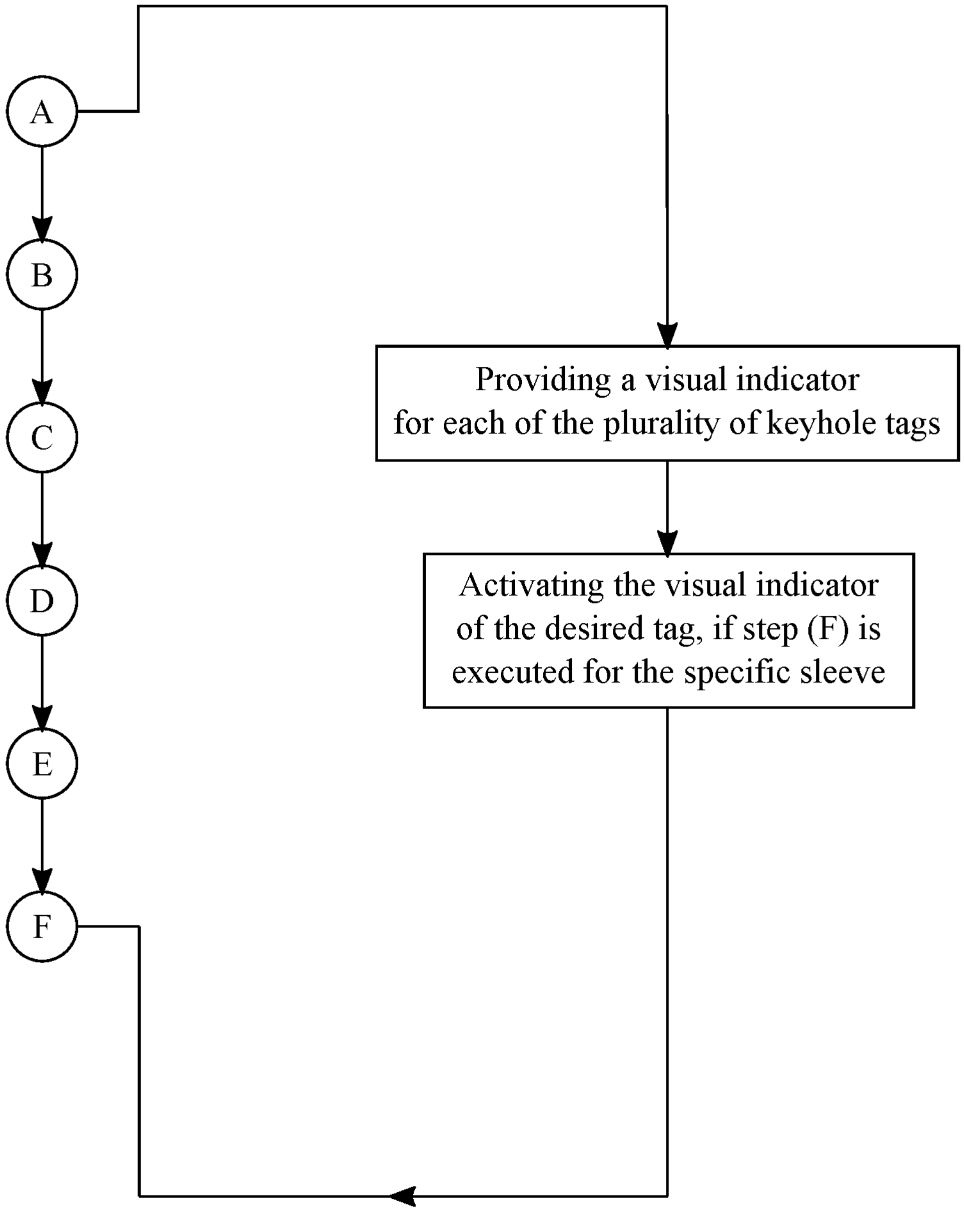
FIG. 7 is a flowchart illustrating the process of activating the visual indicator of the desired tag.

Communication between the selected tag and the selected key sleeve allows the user to identify the corresponding keys amongst a bundle of keys, provided a visual indicator for each of the keyhole tags is attached to the keyhole tags. The visual indictor is preferably a light that continuously blinks as long as the selected tag and the selected sleeve are in communication with one another. The visual indicator of the desired tag is activated, if step (F) is executed for the specific sleeve, as shown in FIG. 7.

Figure 8:
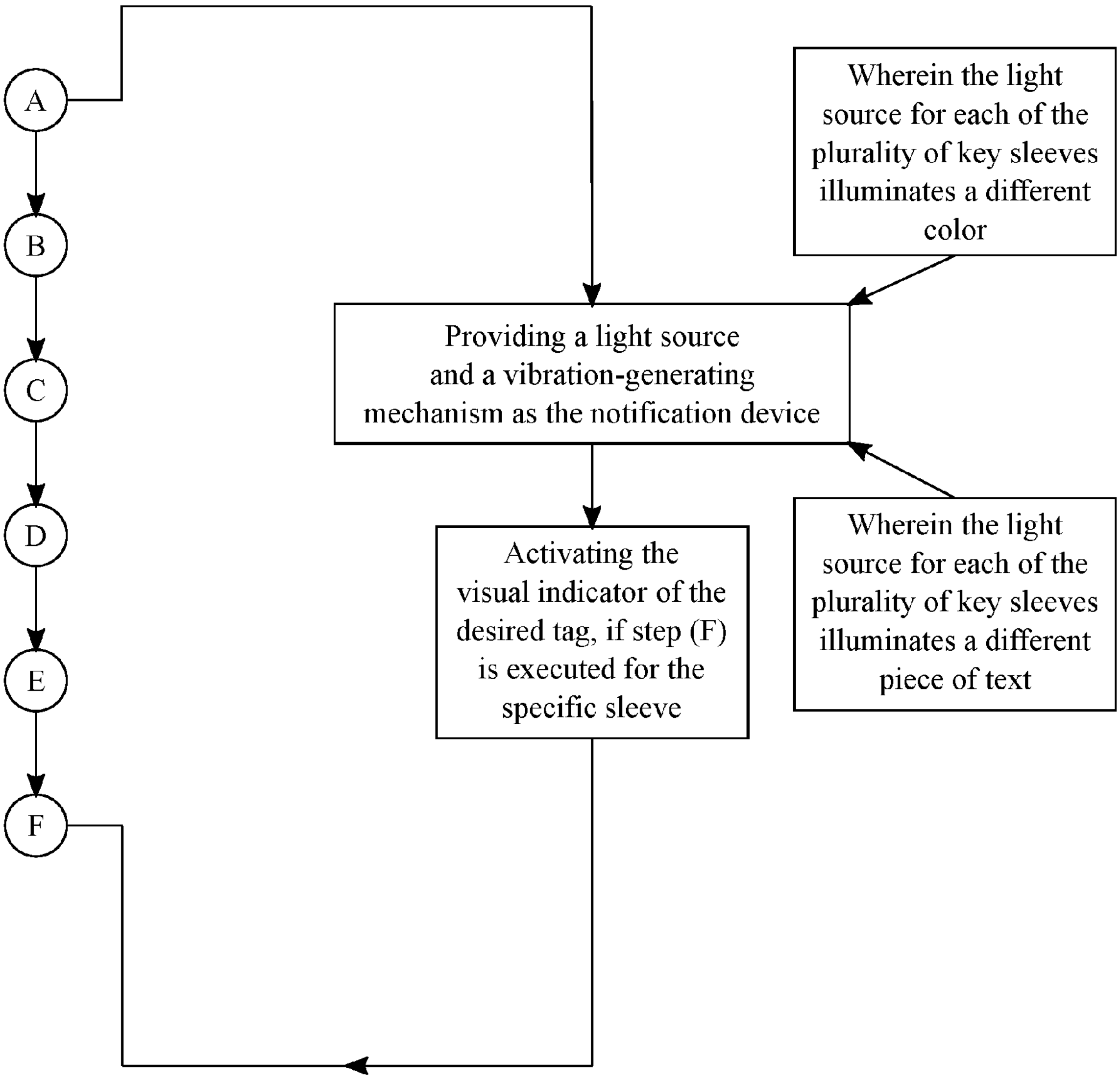
FIG. 8 is a flowchart illustrating the process of activating the visual indicator of the desired tag.

As illustrated in FIG. 8, the user may be further notified provided a light source and a vibration-generating mechanism as the notification device of the at least one notification device of the key sleeve. The light source preferably blinks similarly to that of the visual indicator of the keyhole tags. In order to better distinguish the plurality of key sleeves from one another and better coordinate each of the key sleeves with that of a selected keyhole, the light source for each of the plurality of key sleeves is illuminated a different color and/or a different piece of text. For example, a letter "C" may correspond to a user's car. However, if the user owns more than one car or has the key of another user in his or her bundle of keys, a different color may be used to visually indicate the difference in key sleeves. The piece of text is not limited to a letter, but may be a word or a symbol that better represents the item corresponding to the keyhole tag. The vibration-generating mechanism delivers a tactile pulse to the user's grip via the selected sleeve. The light source and the vibration-generating mechanism is activated, if Step (F) is executed for the specific key sleeve. The user is not only visually notified that the selected key sleeve is near the selected keyhole tag, but the user is notified which specific key of the bundle of keys corresponds to the keyhole as the key sleeve both vibrates and illuminates.

Figure 9:
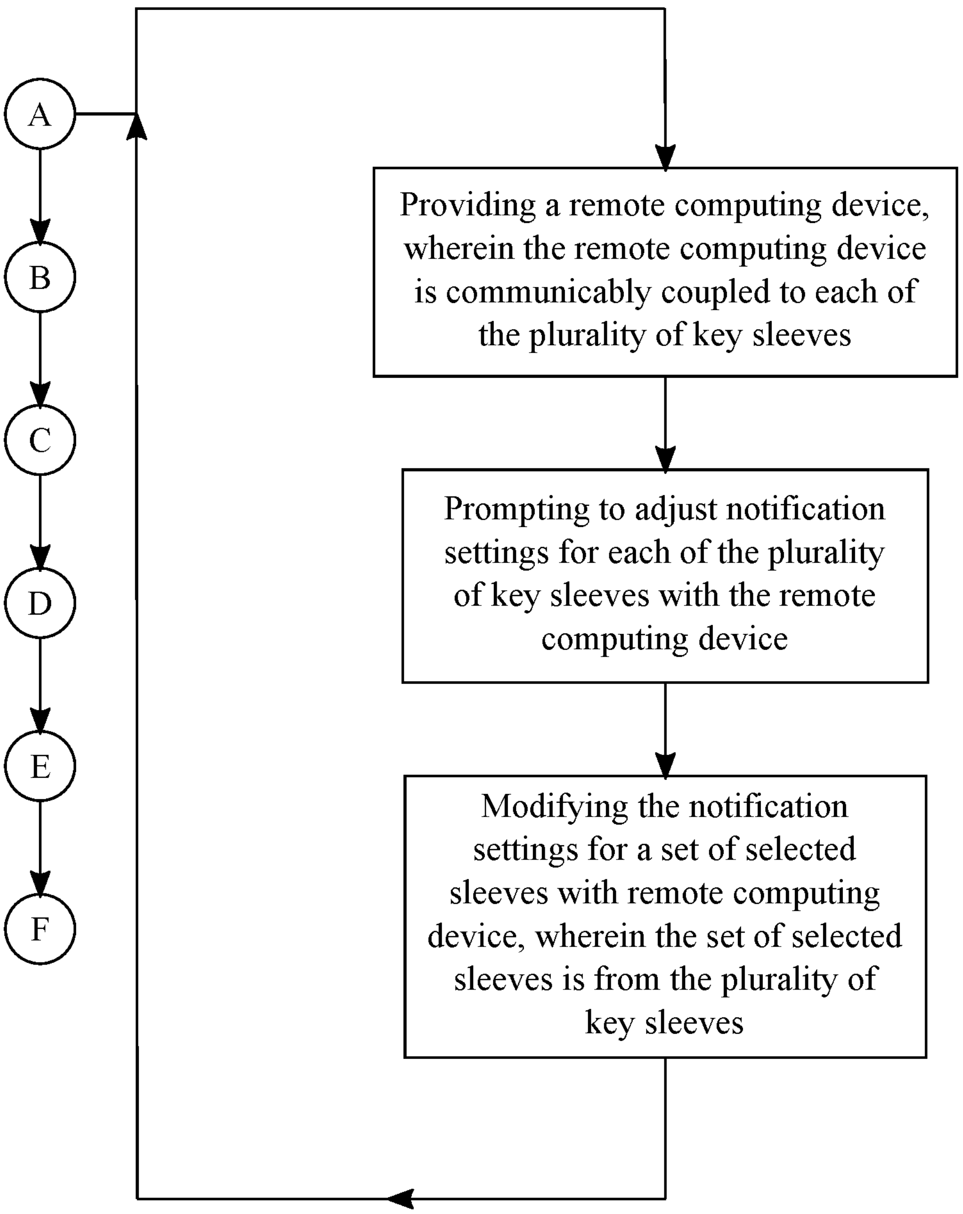
FIG. 9 is a flowchart illustrating the process of modifying the notification settings for a set of selected sleeves.

In order to customize the notification setting from any of the plurality of key sleeves, the user may use a remote computing device, wherein the remote computing device is communicably coupled to each of the plurality of key sleeves. The remote computing device is preferably a smart device such as a smart phone, a tablet, or a smart watch. The smart device preferably has an application that corresponds to the plurality of sleeves of the present invention. The remote computing device prompts the user to adjust the notification settings for each of the plurality of key sleeves so that the user can cater one or more of the key sleeves to have a unique notification. The user is able to modify the notification settings for a set of key sleeves with the remote computing device, wherein the set of the selected sleeves is from the plurality of key sleeves, as shown in FIG. 9. This allows a user to not be bothered by either the light or the vibration of the key sleeve if the user is disturbed by either or chooses to further differentiate the plurality of key sleeves from one another.

Although the invention has been explained in relation to its preferred embodiment, it is to be understood that many other possible modifications and variations can be made without departing from the spirit and scope of the invention as hereinafter claimed.

What is claimed is:

1. A method of identifying a specific key amongst a bundle of keys, the method comprises the steps of:

(A) providing a plurality of keyhole tags, wherein each of the plurality of keyhole tags comprises a wireless transmitter;

(B) providing a plurality of key sleeves, wherein each of the plurality of key sleeves comprises a wireless receiver and at least one notification device associated to a corresponding tag from the plurality of keyhole tags;

(C) broadcasting an identification signal with the wireless transmitter for each of the plurality of keyhole tags;

(D) positioning the plurality of key sleeves adjacent to a desired tag from the plurality of keyhole tags;

(E) receiving the identification signal for the desired tag with the wireless receiver for each of the plurality of key sleeves; and (F) actuating the notification device of a specific key sleeve from the plurality of key sleeves, if the notification device of the specific key sleeve is associated to the desired tag from the plurality of keyhole tags, wherein each of the plurality of keyhole tags has an annular configuration mounted concentrically around a keyhole or a linear configuration mounted in parallel to the keyhole.

2. The method of identifying a specific key amongst a bundle of keys, the method as claimed in claim 1 comprises the steps of:

providing a key and a keyhole, wherein the key is used to lock and unlock the keyhole;

mounting a selected sleeve from the plurality of key sleeves onto the key; and mounting a selected tag from the plurality of keyhole tags adjacent to the keyhole, wherein the selected tag is the corresponding tag of the selected sleeve.

3. The method of identifying a specific key amongst a bundle of keys, the method as claimed in claim 2 comprises the steps of:

providing the selected tag with an annular configuration; and concentrically mounted the selected tag around the keyhole.

4. The method of identifying a specific key amongst a bundle of keys, the method as claimed in claim 2 comprises the steps of:

providing the selected tag with a linear configuration; and mounting the selected tag in parallel the keyhole.

5. The method of identifying a specific key amongst a bundle of keys, the method as claimed in claim 2 comprises the steps of:

providing the selected sleeve with a hinged case and an on/off button;

situating a bow of the key within the hinged case, wherein the on/off is externally positioned on the hinged case; and executing step (E) for the selected sleeve, if the on/off button is pressed to activate the selected sleeve.

6. The method of identifying a specific key amongst a bundle of keys, the method as claimed in claim 1 comprises the steps of:

providing a visual indicator for each of the plurality of keyhole tags; and activating the visual indicator of the desired tag, if step (F) is executed for the specific sleeve.

7. The method of identifying a specific key amongst a bundle of keys, the method as claimed in claim 1 comprises the steps of:

providing a light source and a vibration-generating mechanism as the notification device; and activating the light source and the vibration-generating mechanism, if step (F) is executed for the specific sleeve.

8. The method of identifying a specific key amongst a bundle of keys, the method as claimed in claim 7, wherein the light source for each of the plurality of key sleeves illuminates a different color.

9. The method of identifying a specific key amongst a bundle of keys, the method as claimed in claim 7, wherein the light source for each of the plurality of key sleeves illuminates a different piece of text.

10. The method of identifying a specific key amongst a bundle of keys, the method as claimed in claim 1 comprises the steps of:

providing a remote computing device, wherein the remote computing device is communicably coupled to each of the plurality of key sleeves;

prompting to adjust notification settings for each of the plurality of keyhole sleeves with the remote computing device; and modifying the notification settings for a set of selected sleeves with remote computing device, wherein the set of selected sleeves is from the plurality of key sleeves.

* * * * *